United States Patent Office 3,037,836
Patented June 5, 1962

3,037,836
PROCESS FOR DYEING SYNTHETIC
TEXTILE MATERIALS
Hans-Samuel Bien, Leverkusen, and Fritz Baumann,
Leverkusen-Bayerwerk, Germany, assignors to Farbenfabriken Bayer Aktiengesellschaft, Leverkusen, Germany, a corporation of Germany
No Drawing. Filed Dec. 22, 1959, Ser. No. 861,226
Claims priority, application Germany Jan. 10, 1959
10 Claims. (Cl. 8—55)

This invention relates to dyestuffs for synthetic materials such as polyester and polyamide fibres.

It has been found that the compounds of the Formulae I, II and III and their substitution products are suitable for the dyeing of polyester and polyamide materials.

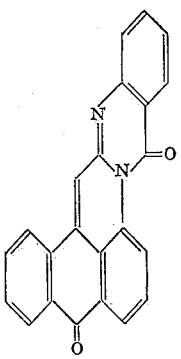

Formula I

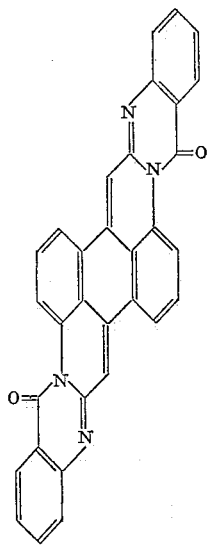

Formula II

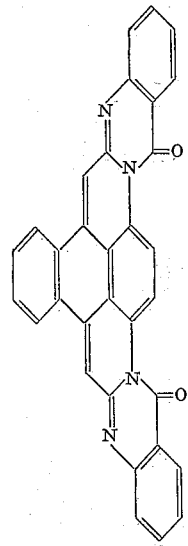

Formula III

Examples of the substituents of these compounds are the hydroxyl, alkoxy, halogeno, chloro, bromo, nitro or amino groups, or sulfonamide groups containing tertiary nitrogen. These compounds may be obtained according to methods known per se, for example, by the reaction of optionally substituted aminoanthraquinones with optionally substituted acetanthranil or by the reaction of optionally substituted acetylaminoanthraquinones with optionally substituted anthranilic acid in the presence of a dehydrating agent such as a mixture of acetic acid anhydride or an inert diluent and molten zinc chloride. The compounds substituted by amino groups may be produced, for example, from the corresponding chlorine derivatives by reaction wtih p-toluene-sulfamide and subsequent saponification. The acyl derivatives may be obtained from these compounds by conventional acylation. Halogenated dyestuffs may be obtained by the action of chlorosulfonic acid or by the action of chlorine or bromine in sulfuric acid or chlorosulfonic acid.

The polyester or polyamide materials to be dyed may be present in any desired form such as filaments, fibres, fabrics or foils.

The dyestuffs are advantageously used in a finely divided form obtained, for example, by pasting with sulfuric acid and/or grinding or kneading with dispersing agents. Sulfite waste liquor, condensation products of β-naphthalene-sulfonic acid with formaldehyde, sulfonated condensation products of urea with formaldehyde or Turkey red oil may be used as dispersing agents, for example. If desired, the dyestuffs may be converted into dispersable powders. Dyeing is carried out by using the dispersed dyestuff in a warm or boiling dyebath or even at an elevated temperature under pressure. If necessary, customary carriers may be added such as benzoic acid, salicylic acid, p-hydroxy-diphenyl, chlorobenzene, phosphoric acid esters, salicylic acid esters, benzoic acid esters or hydroxy-ethylphenyl ether. Fibre material pretreated with an N-formyl compound or chloro-sulfonic acid can be dyed also with these dyestuffs.

The dyeings obtained according to the process of the present invention are distinguished by very good fastness properties, especially by fastness to sublimation, washing and light. Some of the dyestuffs have an extraordinary brilliancy of shade.

Condensation products of α-aminoanthraquinones with anthranilic acid wherein one amino group contains an acetyl radical are known from German patent specification 536,448. The condensation products obtained are only intended to be used as dyestuff intermediates since they are not suitable as dyestuffs for customary fibre materials such as wool, cotton or acetate rayon.

The following examples are given for the purpose of illustrating the invention.

*Example 1*

10 parts of a polyester fabric are introduced at 25 to 30° C. into a dyebath containing 0.1 part of the dyestuff (A) or (B), 400 parts of water and 8 parts of benzoic acid, and the temperature is raised to 100° C. within 20 minutes. The temperature is maintained for 1 hour, the fibre material is then removed, rinsed and aftertreated at 70° C. for 20 minutes with a mixture of 5 parts of a sodium hydroxide solution (38° Bé.) in 1000 parts of water. After acidification, the material is rinsed again. An intense greenish yellow brilliant dyeing of very good fastness properties such as sublimation, washing or light fastness is obtained.

In an analogous manner an intense orange dyeing is obtained with the dyestuff (C) of very good fastness to washing and sublimation.

(A) α: 22.3 parts of 1-amino-anthraquinone and 200 parts of acetic acid anhydride are heated to 100° C. and the glacial acetic acid formed is distilled off under a slight vacuum. When the acylation is completed, 25 parts of zinc chloride and 15 parts of anthranilic acid are added and the glacial acetic acid formed is again distilled off at 100–110° C. After completion of the condensation (1 to 2 hours) the mixture is cooled, filtered off with suction and washed with acetic acid anhydride until the discharge shows a clear yellow color. The residue is briefly boiled in a 10% sodium acetate solution, filtered off with suction and washed neutral. The dyestuff which corresponds to the aforementioned Formula I dissolves in concentrated sulfuric acid with a ruby-red color, melts at 293 to 296° C. and, after pasting with sulfuric acid, is ground with sulfite waste liquor.

β: The anthranilic acid may be replaced by equivalent quantities of acetanthranil or 4- or 5-chloro- or 4-nitro-acetanthranil.

(B) 22.3 parts of 1-amino-anthraquinone, 16.5 parts of acetanthranil and 14 parts of zinc chloride are heated to the boil for one hour in 132 parts of nitrobenzene. The cold product is filtered off with suction, washed with nitrobenzene until the discharge shows a clear yellow color, the nitrobenzene is replaced by methanol and the residue boiled out with a 10% sodium acetate solution. After filtering off with suction, the product is washed neutral and dried. The dyestuff is identical with that produced according to (A). The nitrobenzene may be replaced by trichlorobenzene.

(C) 38.2 parts of the compound of example 2(E)α are heated to 180° C. for one hour with 9 parts of sodium acetate and 0.6 part of copper acetate in 100 parts of p-toluene-sulfamide. The hot melt is then poured into 1000 parts of pyridine, the product is filtered off with suction and washed with pyridine until a yellow discharge is obtained. The residue is subsequently boiled out with dilute hydrochloric acid, and the sulfamide compound is saponified with sulfuric acid. The color of solution in sulfuric acid is yellow-brown. The dyestuff obtained corresponds to the formula

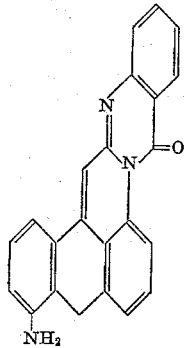

Formula IV

*Example 2*

10 parts of fibre flakes of polyethylene glycol terephthalate are treated at 120° C. for 45 minutes in a bath consisting of 100 parts of water, 0.1 part of dyestuff (D) and 1 part of the reaction product of 1 mol of sperm oil alcohol with 80 mols of ethylene oxide and subsequent sulfonation. Reddish yellow dyeings of very good fastness properties such as sublimation, washing and light fastness are obtained.

If the dyestuff (E) is used, the fibre material is dyed in yellow shades.

(D) 23.9 parts of 5-amino-1-hydroxy-anthraquinone are heated to the boil for one hour in 137 parts of acetic acid anhydride with 14.8 parts of zinc chloride and 17.1 parts of acetanthranil. The cold mass is filtered off with suction and washed with acetic acid anhydride. The residue is boiled out with a sodium acetate solution, filtered off with suction and washed neutral. The dyestuff dissolves in sulfuric acid with a red color and violet discharge. The melting point lies at 280–282° C. After pasting with sulfuric acid, the dyestuff is ground with sulfite waste liquor.

(E) α: 25.8 parts of 1-amino-5-chloro-anthraquinone are heated to the boil for one hour in 120 parts of acetic acid anhydride with 17.2 parts of acetanthranil and 14.8 parts of zinc chloride, and then worked up in a similar manner to that described in Example 2(D). The product crystallizes from nitrobenzene in the form of brown lustrous needles of melting point 303–304° C. and dissolves in sulfuric acid with a red color. The dye-stuff obtained corresponds to the formula IV but contains instead of the amino group a chloro group.

β: Instead of 1-amino-5-chloro-anthraquinone, the corresponding quantities of 4-amino-1-methoxy-anthraquinone, 1-amino-6-sulfodimethylamino-anthraquinone or 1-amino-5-nitro-anthraquinone may be used whereby corresponding in one anthraquinone molecule substituted dyestuffs are obtained.

*Example 3*

10 parts of a hank of polyethylene glycol terephthalate material are dyed at 96–98° C. for 2 hours in a bath of 400 parts of water, 0.1 part of the dyestuff (F) α and 3.4 parts of a mixture of o-, m-, p-cresotic acid methyl ester and 0.6 part of a mixture of equal parts of aralkyl sulfonate and a non-ionic polyglycol ether. The material is subsequently rinsed and dried. Intense greenish yellow dyeings of very good fastness properties such as sublimation, washing and light fastness are obtained.

If 0.5 part of the dyestuff powder prepared according to (G) are used, the polyester fibres are dyed in yellow shades.

With dyestuff (H) a bright red-orange dyeing is obtained on the polyester material.

(F) α: 34.8 parts of the reaction product according to Example 1(A) α or Example 1(B) are dissolved in 55 parts of chlorosulfonic acid, and 0.3 part of iodine and 4.7 parts of bromine are then added. The melt is stirred at 20 to 50° C. until a sample of one dyestuff contains 9 to 11% by weight of bromine which corresponds to an arithmetical content of about 0.5 brom atoms per anthraquinone molecule. The melt is then poured onto ice-bisulfite, washed neutral and the press cake is ground with sulfite waste liquor.

β: Instead of bromine, chlorine may be used. The halogenation may also be carried out in sulfuric acid. Furthermore there can be varied the halogen content for example in such a manner that the dyestuffs contain an arithmetical halogen content of between 0.1 to 0.8 or more halogen atoms per dyestuff molecule. If desired a mixture of halogens such as a mixture of bromine and chlorine may be used for the halogenation.

(G) 25.7 parts of a mixture of 1-amino-6- and 1-amino-7-chloro-anthraquinone are heated to the boil for 2 hours in 100 parts of acetic acid anhydride with 16 parts of anthranilic acid and 25 parts of zinc chloride, and then worked up as described in Example 2(D).

10 parts of the dyestuff are pasted with sulfuric acid, ground with 40 parts of a 100% sulfite waste liquor and evaporated to dryness in vacuo at 70° C.

(H) α: 16 parts of anthranilic acid are heated to 100° C. for 1½ hours with 40 parts of acetic acid anhydride, and 10 parts of 1,4-diamino-anthraquinone are then introduced. When no further amine can be detected, 25 parts of zinc chloride and 40 parts of acetic acid anhydride are added. The mixture is kept at 130° C. for several hours, and the melt is worked up in dilute sodium hydroxide solution. From quinoline, orange crystals are obtained; the color of the solution is green. The dyestuff obtained corresponds to the aforementioned Formula II.

β: If instead of 1,4-diamino-anthraquinone, the corresponding 1,5-derivative is used a yellow polyester dyestuff is obtained. The dyestuff obtained corresponds to the aforementioned Formula III.

We claim:
1. In the process for dyeing a member selected from the group consisting of linear polyester material and polyamide materials the improvement which comprises using as dyestuff a compound selected from the group consisting of

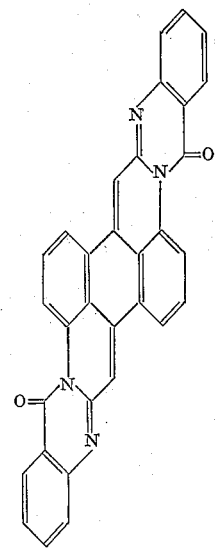

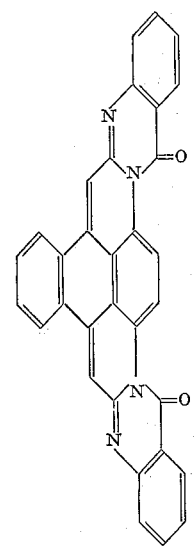

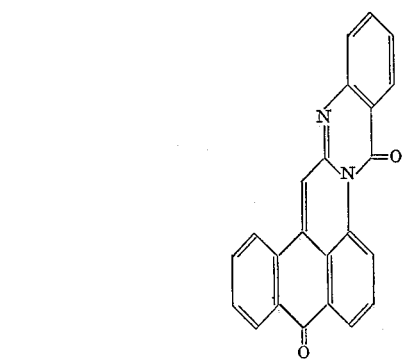

and substitution products thereof.

2. Process as claimed in claim 1 wherein a compound of the formula

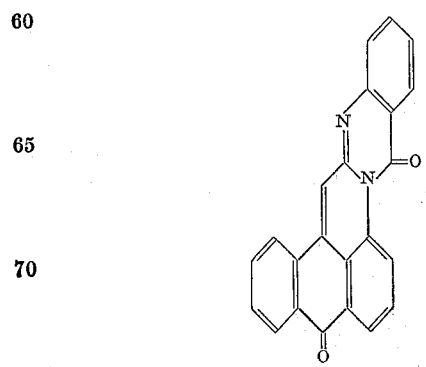

is used as dyestuff.

3. Process as claimed in claim 1 wherein a halogenated product of a compound of the formula

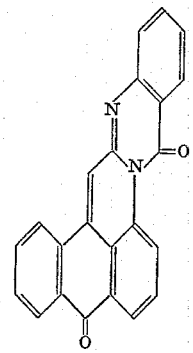

is used as dyestuff, said product being a mixture having an average of 0.1 to 0.8 bromine atom per molecule of said compound.

4. Process as claimed in claim 1 wherein a halogenated product of a compound of the formula

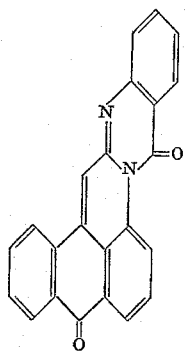

is used as dyestuff, said product being a mixture having an average of 0.1 to 0.8 chlorine atom per molecule of said compound.

5. A member selected from the group consisting of linear polyester and polyamide materials dyed with the dyestuffs

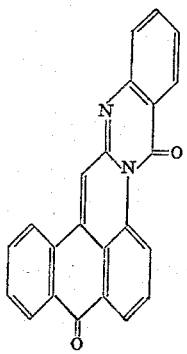

6. The process according to claim 1 wherein the compound is selected from the group consisting of

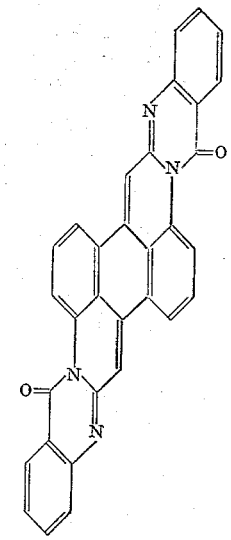

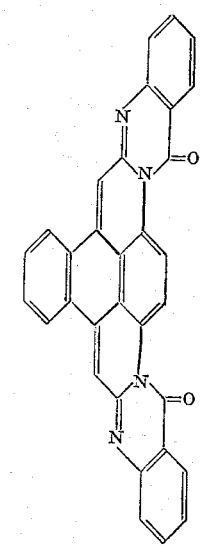

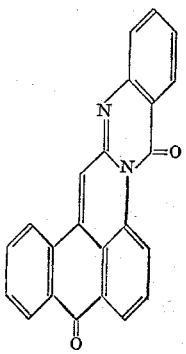

and substitution products thereof, said substitutions being selected from the group consisting of chloro, bromo, sulfonamido, hydroxyl, amino, alkoxy and nitro.

7. The process according to claim 1 wherein the compound is selected from the group consisting of

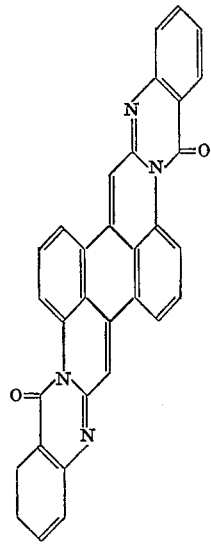

and substitution products thereof, said substitutions being selected from the group consisting of chloro, bromo, sulfonamido, hydroxyl, amino, alkoxy and nitro.

8. The process according to claim 1 wherein the compound is selected from the group consisting of

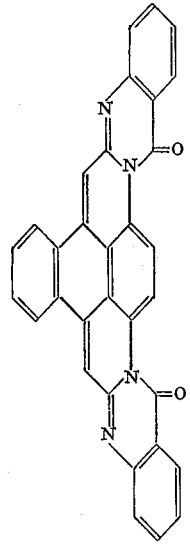

and substitution products thereof, said substitutions being selected from the group consisting of chloro, bromo, sulfonamido, hydroxyl, amino, alkoxy and nitro.

9. The process according to claim 3 wherein the halogenated product has an average of about 0.5 bromine atom per molecule of said compound.

10. The process according to claim 4 wherein the halogenated product has an average of about 0.5 chlorine atom per molecule of said compound.

References Cited in the file of this patent 536,448 (Germany) (cited by applicant and abstracted Chem. Abs., vol. 26, 1932, cols. 1452–1453).

Remington: Amer. Dyest. Rep., December 22, 1952, pp. 859–860.

Lubs: The Chemistry of Synthetic Dyes and Pigments, 1955, pp. 417–426.